United States Patent
Tsai et al.

(10) Patent No.: US 8,912,112 B2
(45) Date of Patent: Dec. 16, 2014

(54) METAL CATALYST COMPOSITION MODIFIED BY NITROGEN-CONTAINING COMPOUND

(75) Inventors: Li-Duan Tsai, Hsinchu (TW);
Sung-Chun Chang, New Taipei (TW);
Hui-Wen Tsai, Nantou County (TW);
Chi-Yun Kang, Taipei (TW);
Jiunn-Nan Lin, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 13/244,290

(22) Filed: Sep. 24, 2011

(65) Prior Publication Data

US 2012/0171593 A1 Jul. 5, 2012

(30) Foreign Application Priority Data

Dec. 29, 2010 (TW) ................................ 99146629 A
Jan. 27, 2011 (TW) ............................ 100103141 A

(51) Int. Cl.
*H01M 4/02* (2006.01)
*B01J 31/00* (2006.01)
*H01M 4/86* (2006.01)
*H01M 4/92* (2006.01)
*H01M 8/10* (2006.01)

(52) U.S. Cl.
CPC ............. *H01M 4/8652* (2013.01); *H01M 4/92* (2013.01); *H01M 4/926* (2013.01); *H01M 8/1011* (2013.01); *Y02E 60/50* (2013.01); *Y02E 60/523* (2013.01)
USPC ............................ 502/167; 429/480; 429/530

(58) Field of Classification Search
None
See application file for complete search history.

(56) References Cited

U.S. PATENT DOCUMENTS

| | | | |
|---|---|---|---|
| 5,683,829 | A | 11/1997 | Sarangapani |
| 2006/0083976 | A1 | 4/2006 | Goddard et al. |
| 2006/0088750 | A1 | 4/2006 | Nobuta et al. |
| 2009/0081487 | A1 | 3/2009 | Chochos et al. |
| 2009/0130526 | A1 | 5/2009 | Higami et al. |
| 2009/0136818 | A1 | 5/2009 | Fujibayashi et al. |
| 2011/0003071 | A1* | 1/2011 | Uensal et al. .................. 427/58 |

FOREIGN PATENT DOCUMENTS

| | | |
|---|---|---|
| CN | 1861686 A | 11/2006 |
| CN | 101238602 A | 8/2008 |
| CN | 101259436 A | 9/2008 |
| CN | 101328275 A | 12/2008 |
| CN | 101919102 | 12/2010 |
| JP | 2885654 | 4/1999 |
| JP | 2005-044550 | 2/2005 |
| JP | 2005-66592 | 3/2005 |

(Continued)

OTHER PUBLICATIONS

Lai et al., "Mechanisms of Carbon Monoxide and Methanol Oxidation at Single-crystal Electrodes", Top Catal, vol. 46, Oct. 12, 2007, 320-333.

(Continued)

*Primary Examiner* — Sarah A Slifka
(74) *Attorney, Agent, or Firm* — Jianq Chyun IP Office

(57) ABSTRACT

The present invention relates to a metal catalyst composition modified by a nitrogen-containing compound, which effectively reduces cathode catalyst poisoning. The catalyst composition applied on the anode also lowers the over-potential. The catalyst coupled with the nitrogen-containing compound has increased three-dimensional hindrance, which improves the distribution of the catalyst particles and improves the reaction activity.

8 Claims, 4 Drawing Sheets

(56) References Cited

FOREIGN PATENT DOCUMENTS

| JP | 2005-158646 | 6/2005 |
| JP | 2007-035325 | 2/2007 |
| JP | 3877794 | 2/2007 |
| JP | 2008-161754 | 7/2008 |
| JP | 2008-169337 | 7/2008 |
| JP | 4140909 | 8/2008 |
| JP | 2009158372 | 7/2009 |
| JP | 2009299111 | 12/2009 |
| WO | 2009093080 | 7/2009 |
| WO | WO 2009/109512 | * 11/2009 |

OTHER PUBLICATIONS

K. Kinoshita, "Particle Size Effects for Oxygen Reduction on Highly Dispersed Platinum in Acid Electrolytes", J. Electrochem. Soc., vol. 137, No. 3, Mar. 1990, 845-848.

Novell-Leruth et al., "Ammonia Dehydrogenation over Platinum-Group Metal Surfaces. Structure, Stability, and Reactivity of Adsorbed NHx Species" J. Phys. Chem. C, vol. 111, Nov. 18, 2006, 860-868.

Fujigaya et al., "Design of an assembly of pyridine-containing polybenzimidazole, carbon nanotubes and Pt nanoparticles for a fuel cell electrocatalyst with a high electrochemically active surface area", Carbon, vol. 47, Jul. 18, 2009, 3227-3232.

Matter et al., "The role of nanostructure in nitrogen-containing carbon catalysts for the oxygen reduction reaction", Journal of Catalysis, vol. 239, Feb. 10, 2006, 83-96.

Subbaraman et al., "Triazole and triazole derivatives as proton transport facilitators in polymer electrolyte membrane fuel cells", Solid State Ionics, vol. 180, May 14, 2009, 1143-1150.

"Office Action of Taiwan Counterpart Application", issued on Jul. 4, 2013, p. 1-p. 5.

"Office Action of China Counterpart Application", issued on Sep. 17, 2013, p. 1-p. 10.

"Office Action of China Counterpart Application", issued on Jun. 11, 2014, p. 1-p. 6.

* cited by examiner

METAL CATALYST COMPOSITION MODIFIED BY NITROGEN-CONTAINING COMPOUND

CROSS-REFERENCE TO RELATED APPLICATION

This application claims the priority benefit of Taiwan application serial no. 99146629, filed Dec. 29, 2010 and the priority benefit of Taiwan application serial no. 100103141, filed Jan. 27, 2011. The entirety of each of the above-mentioned patent applications is hereby incorporated by reference herein and made a part of this specification.

BACKGROUND OF THE INVENTION

1. Field of the Invention

The present invention generally relates to a catalyst. More particularly, the present invention relates to a metal catalyst for the fuel cell.

2. Description of Related Art

On account of the great demand for clean energy, fuel cells have been widely applied in industry, housing and transportation. Direct methanol fuel cell (DMFC) directly converts methanol into electric energy for portable applications, including laptops and mobile phones.

In principle, methanol that diffuses to the cathode (methanol crossover) will cause catalyst poisoning in the cathode, especially when using high concentrations of methanol as the fuel. Also, high overpotential losses of the anode exist in the direct methanol fuel cell, leading to lower discharge voltage and inferior activity.

SUMMARY OF THE INVENTION

The present invention is directed to a metal catalyst modified by a nitrogen-containing compound. Taking advantage of the coordination of the d orbital of the metal catalyst with the lone pairs of the nitrogen atoms in the nitrogen-containing compound, the binding positions of the metal catalyst for carbon mono-oxide (CO) are occupied and become unavailable, which effectively reduces cathode catalyst poisoning. The catalyst composition applied on the anode also lowers the overpotential. The steric hindrance of the metal catalyst coupled with the nitrogen-containing compound is increased, which improves the dispersion of the catalyst particles and increases the reaction activity.

The present invention provides a catalyst composition applicable on the electrode surface of a fuel cell. The catalyst composition includes a metal catalyst and a nitrogen-containing compound. The nitrogen-containing compound is a nitrogen-containing 5-membered heterocyclic compound. The nitrogen-containing 5-membered heterocyclic compound can be an unsaturated, substituted or non-substituted, nitrogen-containing 5-membered ring compound.

According to embodiments of the present invention, the nitrogen-containing compound has the structure of the following formula (I):

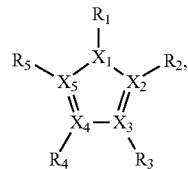

wherein $R_1$-$R_5$ can individually be hydrogen, alkyl, $NH_2$ or $NR_6R_7$, $R_6$ and $R_7$ can individually be alkyl, hydroxyl or alkoxyl, $X_1$, $X_2$, $X_3$, $X_4$ and $X_5$ can individually be carbon or nitrogen but at least one of $X_1$, $X_2$, $X_3$, $X_4$ and $X_5$ is nitrogen.

According to embodiments of the present invention, the nitrogen-containing compound has the structure of the following formula (II):

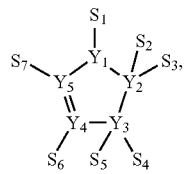

wherein $S_1$-$S_7$ can individually be hydrogen, alkyl, $NH_2$ or $NS_8S_9$, $S_8$ and $S_9$ can individually be alkyl, hydroxyl or alkoxyl, $Y_1$, $Y_2$, $Y_3$, $Y_4$ and $Y_5$ can individually be carbon or nitrogen but at least one of $Y_1$, $Y_2$, $Y_3$, $Y_4$ and $Y_5$ is nitrogen.

The present invention provides a membrane electrode assembly applicable for the fuel cells. The membrane electrode assembly includes a proton exchangeable polymer membrane, a cathode catalyst layer and an anode catalyst layer respectively disposed on both sides of the polymer membrane and two gas diffusion layers respectively disposed on the cathode and anode catalyst layers. At least one of the cathode and anode catalyst layers includes a catalyst composition having a metal catalyst and a nitrogen-containing compound, which compound is a nitrogen-containing 5-membered heterocyclic compound.

According to embodiments of the present invention, the nitrogen-containing compound has the structure of the following formula (I):

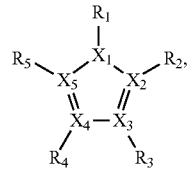

wherein $R_1$-$R_5$ can individually be hydrogen, alkyl, $NH_2$ or $NR_6R_7$, $R_6$ and $R_7$ can individually be alkyl, hydroxyl or alkoxyl, $X_1$, $X_2$, $X_3$, $X_4$ and $X_5$ can individually be carbon or nitrogen but at least one of $X_1$, $X_2$, $X_3$, $X_4$ and $X_5$ is nitrogen.

According to embodiments of the present invention, the nitrogen-containing compound has the structure of the following formula (II):

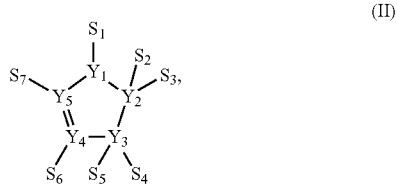

wherein $S_1$-$S_7$ can individually be hydrogen, alkyl, $NH_2$ or $NS_8S_9$, $S_8$ and $S_9$ can individually be alkyl, hydroxyl or alkoxyl, $Y_1$, $Y_2$, $Y_3$, $Y_4$ and $Y_5$ can individually be carbon or nitrogen but at least one of $Y_1$, $Y_2$, $Y_3$, $Y_4$ and $Y_5$ is nitrogen.

According to embodiments of the present invention, the nitrogen-containing compound can be selected from the following group consisting of pyrrole and pyrrole derivatives (pyrroles), pyrroline and pyrroline derivatives (pyrrolines), imidazole and imidazole derivatives (imidazoles), imidazoline and imidazoline derivatives (imidazolines), and triazole and triazole derivatives (triazoles). The metal catalyst can be a pure metal catalyst or a metal catalyst with a support. The nitrogen-containing compound is selected from the following group consisting of N-methylpyrrole, 1,2,3-triazole, 1,2,4-triazole, 2-methyl-2-imidazoline and 2,4-dimethyl-2-imidazoline. The weight ratio of the active portion of the metal catalyst (excluding the support) and the nitrogen-containing compound ranges from 1:2 to 25:1.

In order to make the above and other features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Common reference numerals are used throughout the drawings and the detailed description to indicate the same elements. The present invention will be more apparent from the following detailed description taken in conjunction with the accompanying drawings.

DESCRIPTION OF THE EMBODIMENTS

Figure 1:
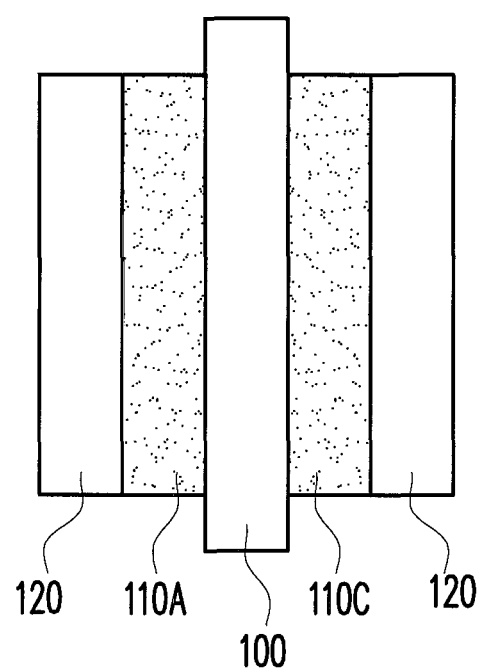
FIG. 1 is a schematic display of the membrane electrode assembly.

The present invention is directed to a metal catalyst modified by a nitrogen-containing compound. Taking advantage of the coordination of the d orbital of the metal catalyst with the lone pairs of the nitrogen atoms in the nitrogen-containing compound, the binding positions of the metal catalyst for carbon mono-oxide (CO) are occupied and become unavailable, which effectively reduces cathode catalyst poisoning.

The metal catalyst coupled with the nitrogen-containing compound has increased steric hindrance, which improves the dispersion of the catalyst particles, lowers the activity loss from aggregation and increases the reaction activity. The catalyst composition applied on the anode also lowers the overpotential.

The present invention provides a catalyst composition including a metal catalyst modified by a nitrogen-containing compound. The weight ratio of the active portion of the metal catalyst (excluding the support) and the nitrogen-containing compound ranges from 1:2 to 25:1.

The metal catalyst herein includes all of the common metal catalysts applicable for various fuel cells, including the pure metal catalyst or the metal catalyst with the support. The materials of the pure metal catalyst include Pt, Pt—Ru, Pt—Co, Pt—Rh, Pt—Sn, Pt—Ni and Pt—Au, the combinations and the alloys thereof, for example. The support can be carbon supports, including carbon black, carbon nanotubes, porous carbon and sea urchin shaped carbon nanostructured materials, etc. The materials of the catalyst for the present invention are not limited by the above-mentioned examples, and the modification or adjustments of the metal catalyst and the support are encompassed within the scope of this invention.

The catalyst composition of this invention is applicable on the electrode surface of a fuel cell. The nitrogen-containing compound of present invention is a nitrogen-containing 5-membered heterocyclic compound. The nitrogen-containing 5-membered heterocyclic compound can be an aromatic or non-aromatic, nitrogen-containing 5-membered ring compound.

According to one embodiment of the present invention, the nitrogen-containing compound has the structure of the following formula (I):

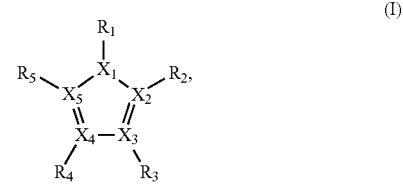

wherein $R_1$-$R_5$ can individually be hydrogen, alkyl, $NH_2$ or $NR_6R_7$, $R_6$ and $R_7$ can individually be alkyl, hydroxyl or alkoxyl, or an electron-pushing group, $X_1$, $X_2$, $X_3$, $X_4$ and $X_5$ can individually be carbon or nitrogen but at least one of $X_1$, $X_2$, $X_3$, $X_4$ and $X_5$ is nitrogen.

According to another embodiment of the present invention, the nitrogen-containing compound has the structure of the following formula (II):

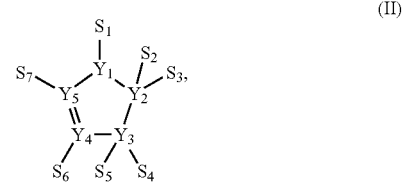

wherein $S_1$-$S_7$ can individually be hydrogen, alkyl, $NH_2$ or $NS_8S_9$, $S_8$ and $S_9$ can individually be alkyl, hydroxyl or alkoxyl, $Y_1$, $Y_2$, $Y_3$, $Y_4$ and $Y_5$ can individually be carbon or nitrogen but at least one of $Y_1$, $Y_2$, $Y_3$, $Y_4$ and $Y_5$ is nitrogen.

The nitrogen-containing compound of the present invention can be prepared based on the commonly used preparation methods or synthesis processes in the organic chemistry field. Depending on the various substitutional groups, the solvents, reaction parameters, reaction temperatures or additives can be accordingly adjusted or changed. Such adjustments should not be limited to the embodiments provided herein and is well understood by the artisan.

The catalyst of this invention can be prepared by the common preparation methods, including colloid, micro-emulsion, and impregnation methods.

Taking the catalyst with carbon black support and prepared by the colloid method as an example, anhydrous metal salts is added to the dry solvent under waterless nitrogen environment and the reducing agent is slowly added to the mixture solution dropwise. When the solution turns black or hydrogen gas is generated, the reduction reaction is complete and stably dispersed as a colloid solution. The solution is stirred and carbon black is added as the catalyst support, keeps stirring to remove the solvent, washed by ethanol and dried up to obtain the metal catalyst. The catalyst prepared by the colloid method has small particle sizes of about 1.5 nm to 3 nm and good dispersion. The most common impregnation method is to dissolve the metal salts in the solvent, impregnate with carbon black under stirring and reduced by adding the reducing agent. Based on the preparation conditions, the catalyst prepared by the impregnation method may be changeably dispersed and have particle sizes ranging from 2 nm to 20 nm.

The metal catalyst of this invention can be applicable for fuel cells and other fields, such as electrochemical batteries, including air batteries.

In general, the fuel cell includes electrodes, separation/exchange membrane and current collectors. The oxidation reaction of the fuel and the reduction reaction of the oxidizing agent occur by the electrodes (the anode and the cathode), and the membrane functions to separate the oxidizing agent and the reducing agent and allows the protons to pass through.

For direct methanol fuel cells (DMFC), methanol is oxidized into hydrogen ions (protons) and electrons that travel through the external circuit as the electric output of the fuel cell. The hydrogen ions travel through the membrane and react with oxygen from the cathode and the electrons from the external circuit to form water and generate heat. The electrodes set of DMFC is a membrane electrode assembly.

FIG. 1 is schematic display of the membrane electrode assembly of the fuel cell. Referring to FIG. 1, the membrane electrode assembly 10 includes a separation/polymer membrane 100. The separation/polymer membrane 100 can be a proton exchange membrane (PEM) of a solid ionic polymer material, such as, Nafion ionic polymer membrane. The separation/polymer membrane 100 must allow proton transport and prevent electron and gas moving across. The catalyst reaction layers 110 on both sides of the separation/polymer membrane 100 include an anode catalyst layer 110A and a cathode catalyst layer 110C upon where the electrochemical reactions of the anode and the cathode occur. The gas diffusion layers 120 are disposed on the catalyst reaction layers 110 (respectively on the anode catalyst layer 110A and the cathode catalyst layer 110C). The material of the anode catalyst layer 110A may be PtRu on carbon support (PtRu/C), while the material of the cathode catalyst layer 110C may be Pt/C, for example. The material of the electrode (either anode or cathode) may be Pt/C, PtRu/C, PtRu or Pt, for example.

The exemplary preparation method of the catalyst composition includes mixing the metal salts, the carbon support (such as, carbon black), perfluorocarbon sulfonic acid solution, alcohol/water mixture and the nitrogen-containing compound of the present invention under ultrasonic vibration and stirring, so as to prepare the catalyst slurry. Later, the catalyst slurry is coated to the gas diffusion layers by the doctor blade to form the gas diffusion electrodes and vacuum dried. The resultant gas diffusion electrodes (anode and cathode) and the proton exchange membrane are thermally pressed together, in the sequence of anode-PEM-cathode, so as to obtain the membrane electrode assembly.

In the following experiments, the fuel cell electrodes (cathode or anode) using the metal catalyst modified by the nitrogen-containing compound of the present invention are compared with the fuel cell electrode using the unmodified metal catalyst.

The performances of the catalyst composition can be evaluated by measuring electrochemical surface active area (ECSA), methanol oxidation reaction (MOR), and oxygen reduction reaction (ORR). In these measurements, the evaluated electrodes are prepared by coating the catalyst slurry to the glassy carbon disc of the rotation disc electrode (RDE), and then vacuum dried at 60° C. for 2 hours. The catalyst slurry is prepared by mixing the platinum catalyst, the nitrogen-containing compound, Nafion solution (from DuPont) and solvent(s) under stirring for better dispersion and de-bubbling.

The electrochemical surface area (ECSA) of fuel cell electrodes can be measured by CV analysis, presented as a voltammogram of current vs. the working electrode potential, involving cycling the evaluated electrode over a potential range where charge transfer reactions are adsorption-limited at the activation sites. The ECSA of the catalyst or catalyst composition is calculated from the charge obtained from the CV experiment.

Integration of the hydrogen desorption/adsorption peaks that result as a consequence of the forward and reverse scans, respectively, is used to estimate the electrochemically active surface area of the electro catalyst.

ECSA: The electrolytic solution (0.5M sulfuric acid) is supplied with nitrogen gas to remain oxygenless, and the measurement is performed under room temperature. Cyclic voltammetry (CV) scanning is performed at a scan rate of 5 mV/s, the potential cycling from 1.0V to 0V (vs. reversible hydrogen electrode (RHE)) and under the electrode rotation speed of 0 rpm. The recorded spectrum is analyzed to determine the integration area of the hydrogen adsorption peak (three platinum crystal faces from 0.05V to 0.3V) in the reduction scan (scanning from high voltage to low voltage) for comparison.

MOR: The measurement is similar to ECSA, except the electrolytic solution is (0.5M sulfuric acid+1M methanol). The recorded spectrum is analyzed to determine the integration area of the methanol oxidation current (scanning from low voltage to high voltage) of the electrode(s) (from 0.3V to 0.7V), which is directly proportional to the activity of MOR. The onset potential for the oxidation peak represents the onset of methanol oxidation.

ORR: After supplying the electrolytic solution (0.5M sulfuric acid) with oxygen for 30 minutes, the RDE is placed into the solution and the oxygen supply remains. The electrolytic solution will be added with 0.1M methanol, if the methanol tolerance property is measured. The measurement is performed under room temperature. Cyclic voltammetry (CV) scanning is performed at a scan rate of 5 mV/s, the potential cycling from 1.1V to 0.5V (vs. RHE) and under the electrode rotation speed of 1600 rpm. The recorded spectrum is analyzed to determine current value at 0.6V, which is reversely proportional to the reaction activity (i.e. the negative value is proportional to the reduction current). For the methanol tolerance experiment (Exp 4), the methanol oxidation peak values at 0.6V-0.8V are compared, which is reversely proportional to methanol tolerance (larger the positive value means larger the oxidation current and less the methanol tolerance). Small methanol tolerance means that the catalyst activity is easily affected by methanol. The oxidation peaks appear in later cycles indicate better tolerance to methanol (i.e. less prone to methanol poisoning).

Exp 1: Anode catalyst composition using PtRu/C modified with various nitrogen-containing compounds of the present invention.

The measurements of MOR are performed with the electrolytic solution (0.5M sulfuric acid+1M methanol) and the metal catalyst with the support, where 70% wt of the total weight of the metal catalyst with the support (PtRu/C) is the metal catalyst. That is, the metal catalyst portion of the metal catalyst with the support (PtRu/C) takes 70% wt of the total weight of the metal catalyst composition. The weight ratio of the metal catalyst portion to the nitrogen-containing compound is about 1:1.6. The control group uses the unmodified catalyst composition having 70% wt PtRu/C, which lacks of the nitrogen-containing compound.

TABLE 1

| Samples | Overpotential Onset (V) | MOR oxidation peak potential $E_{peak}$ (V) | MOR oxidation peak current $I_{peak}$ (A/g) |
|---|---|---|---|
| Control: 70% PtRu/C | 0.294 | 0.73 | 210 |
| Sample 1: 70% PtRu/C+ (modified by 2,4 dimethyl-2-imidazoline) | 0.275 | 0.73 | 425 |
| Sample 2: 70% PtRu/C+ (modified by imidazole) | 0.293 | 0.788 | 394 |
| Sample 3: 70% PtRu/C+ (modified by pyridine) | 0.277 | 0.74 | 196 |
| Sample 4: 70% PtRu/C+ (modified by triazole) | 0.286 | 0.76 | 359 |

From Table 1, compared with the control sample, it is shown that the metal catalysts modified by the nitrogen-containing compound of the present invention have lower overpotentials (about 10-20 mV lower) and higher MOR oxidation peak currents (increased to about 1.5 to 2 times), and thus have increased activities. By using the nitrogen-containing compound(s) of the present invention to modify PtRu/C as the anode catalyst, the anode overpotential is lowered and the activity of the anode metal catalyst is improved by the catalyst particles coupled with the nitrogen-containing compound(s). For the nitrogen-containing compounds of Table 1, the five-membered heterocyclic compounds work better and pyridine has little effects when compared with the control.

Exp 2: Anode catalyst composition using PtRu/C and various ratios of the nitrogen-containing compound (triazoles).

The measurements of MOR are performed with the electrolytic solution (0.5M sulfuric acid+1M methanol) and the metal catalyst with the support, where the metal catalyst portion of the metal catalyst with the support (PtRu/C) takes 70% wt of the total weight of the metal catalyst composition. The weight ratio of the metal catalyst portion to the nitrogen-containing compound ranges from about 2.5:1 to about 30:1.

TABLE 2

| Samples | Onset (V) | $I_{peak}$ (A/g) |
|---|---|---|
| 70% PtRu/C (without the nitrogen-containing compound) | 0.294 | 270 |
| 70% PtRu/C+ the nitrogen-containing compound (addition ratio 2.5:1) | 0.29 | 378 |
| 70% PtRu/C+ the nitrogen-containing compound (addition ratio 10:1) | 0.275 | 436 |
| 70% PtRu/C+ the nitrogen-containing compound (addition ratio 20:1) | 0.277 | 379 |
| 70% PtRu/C+ the nitrogen-containing compound (addition ratio 30:1) | 0.284 | 267 |

From Table 2, compared with the control (without the nitrogen-containing compound), it is found that the samples with the addition ratios from 2.5:1 to 20:1 provide increased catalyst activities and lowered anode overpotentials. However, the sample with the addition ratio of about 10:1 works better.

Exp 3: Cathode catalyst composition using nitrogen-containing compounds and Pt/C (the addition ratio of the metal catalyst to nitrogen-containing compound (imidazolines)=4:1).

Figure 2:
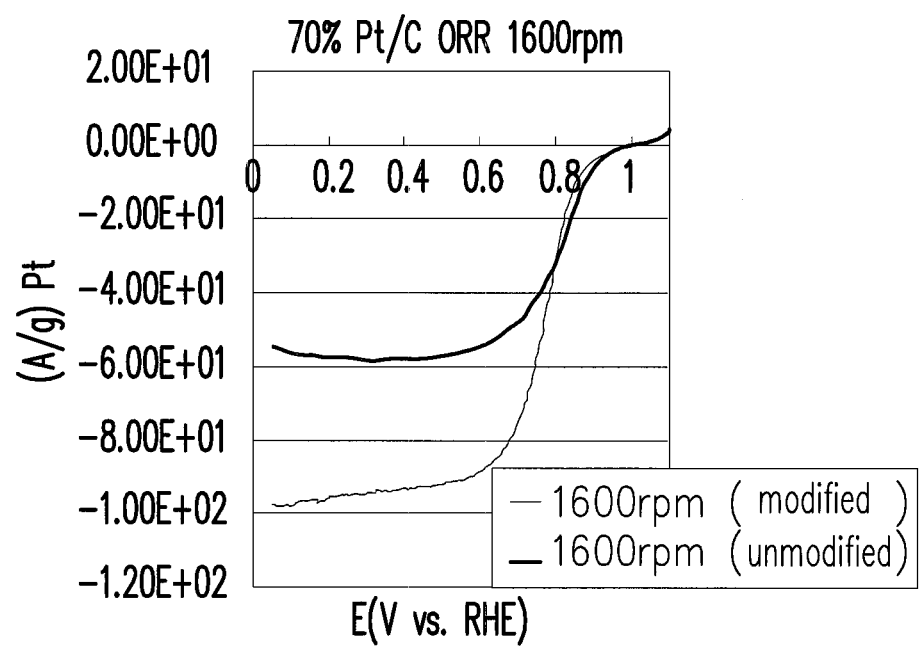
FIG. 2 is a voltammogram showing the oxygen reduction current versus potential for Pt—C cathode.
Figure 3:
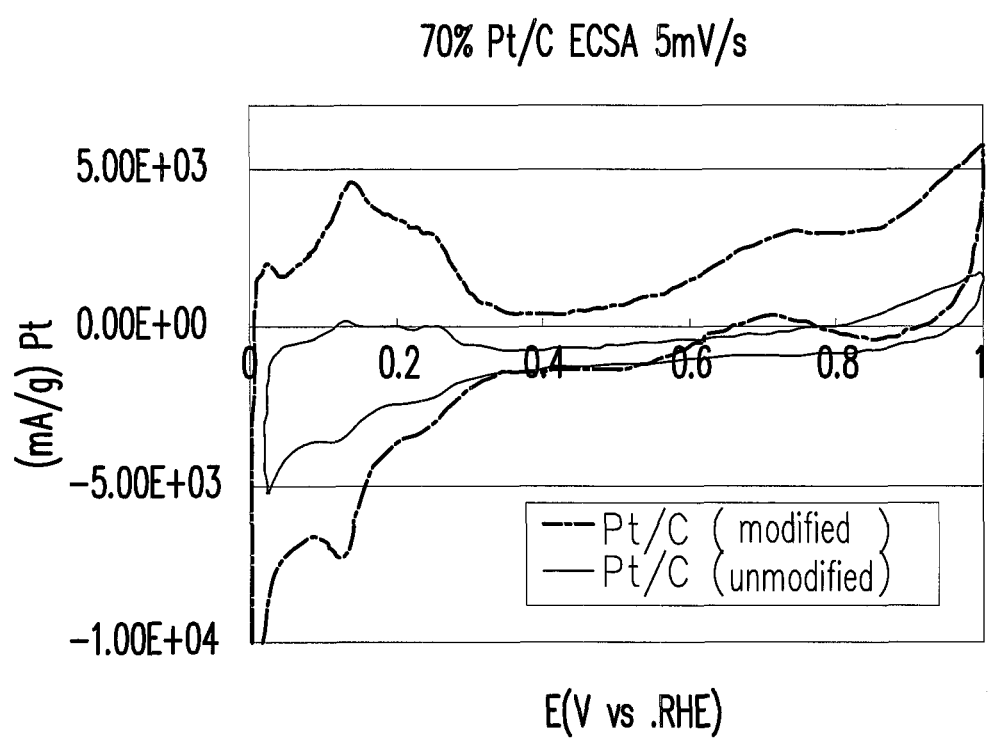
FIG. 3 is a cyclic voltammogram showing the current versus potential for Pt/C cathode.

The measurements of ORR are performed. Using the acidic solution supplied with oxygen, cyclic voltammetry (CV) scanning is performed with the potential cycling from 1.1V to 0.5V (vs. RHE). The values of the current density (A/g) at the same voltage for various samples are analyzed, which are proportional to the ECSA values of the catalysts. Referring to FIGS. 2 and 3, by adding the nitrogen-containing compound imidazolines, the activities of the cathode catalysts are improved with the ECSA values increased by one time and the ORR current values at 0.6 V increased by 60%.

Exp 4: Cathode catalyst composition using nitrogen-containing compounds and Pt/C (the addition ratio of the metal catalyst to nitrogen-containing compound (imidazoles)=8:1).

Figure 4:
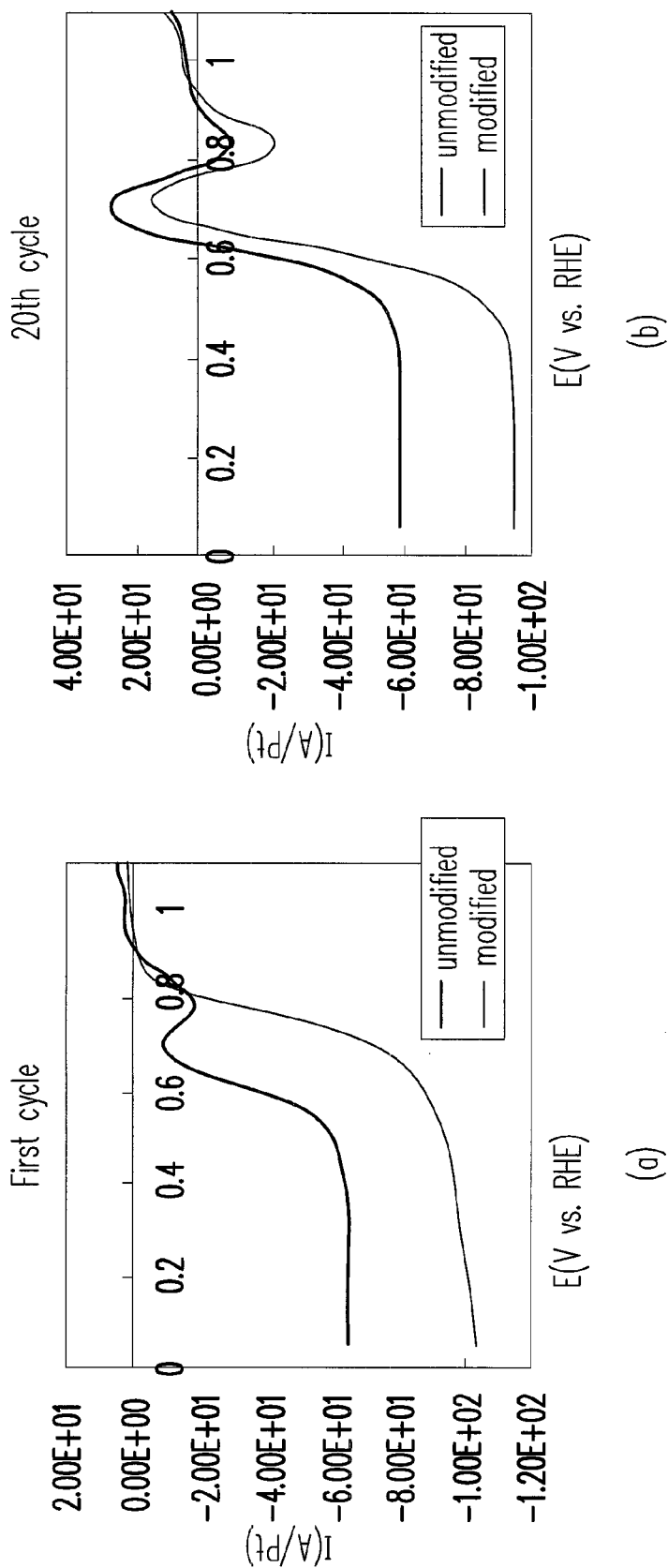
FIGS. 4(a)-4(b) are voltammograms showing the current versus potential for Pt—C cathode at the first cycle and the 20$^{th}$ cycle of the ORR measurement with methanol presented.

The anti-poisoning measurements are performed, using the ORR measurements plus methanol with the electrolytic solution (0.5M sulfuric acid+1M methanol). Referring to FIGS. 4(a)-(b), the electrode poisoning occurs at later cycles for the electrodes with the metal catalysts modified by the nitrogen-containing compounds, indicating better anti-CO poisoning capabilities. It is observed that no methanol oxidation peak shows at the first cycle of ORR. For the electrodes with the metal catalysts modified by the nitrogen-containing compounds, the values of the present methanol oxidation peaks are lower (close to zero). Hence, the addition of the nitrogen-containing compound into the metal catalyst compositions indeed helps to improve the anti-poisoning ability of the catalysts.

In the above embodiments, the direct methanol fuel cell is used as an example of the potential applications of the nitrogen-containing compounds of the present invention. However, the applications or details and conditions of the operating methods should not be limited to the embodiments provided herein and can be utilized in other related fields, structures or products that are well understood by the skilled in art.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not be necessarily being drawn to scale. There may be distinctions between the artistic renditions in the present disclosure and the actual apparatus due to manufacturing processes and tolerances. There may be other embodiments of the present invention which are not specifically illustrated. The specification and the drawings are to be regarded as illustrative rather than restrictive. Modifications may be made to adapt a particular situation, material, composition of matter, method, or process to the objective, spirit and scope of the invention. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the invention.

What is claimed is:

1. A metal catalyst modified by a nitrogen-containing compound, wherein the nitrogen-containing compound is a nitrogen-containing 5-membered heterocyclic compound, wherein the nitrogen-containing compound is selected from the following group consisting of pyrrole and pyrrole derivatives (pyrroles), pyrroline and pyrroline derivatives (pyrrolines), imidazole and imidazole derivatives (imidazoles), imidazoline and imidazoline derivatives (imidazolines), and triazole and triazole derivatives (triazoles), wherein the nitrogen-containing compound has the structure of the following formula (I):

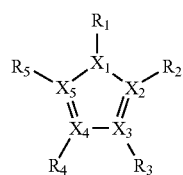

wherein $R_1$-$R_5$ are individually hydrogen, alkyl, $NH_2$ or $NR_6R_7$, $R_6$ and $R_7$ are individually alkyl, hydroxyl or alkoxyl, $X_1$ is nitrogen, and $X_2$, $X_3$, $X_4$ and $X_5$ are individually carbon or nitrogen, and the nitrogen-containing compound is electro-neutral; or the nitrogen-containing compound has the structure of the following formula

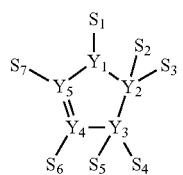

wherein $S_1$-$S_7$ are individually hydrogen, alkyl, $NH_2$ or $NS_8S_9$, $S_8$ and $S_9$ are individually alkyl, hydroxyl or alkoxyl, $Y_1$ is nitrogen and $Y_2$, $Y_3$, $Y_4$ and $Y_5$ are individually carbon or nitrogen, and the nitrogen-containing compound is electro-neutral.

2. The metal catalyst of claim 1, wherein the nitrogen-containing compound is selected from the following group consisting of N-methylpyrrole, 1,2,3-triazole, 1,2,4-triazole, 2-methyl-2-imidazoline and 2,4-dimethyl-2-imidazoline.

3. The metal catalyst of claim 1, wherein the metal catalyst is a pure metal catalyst or a metal catalyst with a support.

4. The metal catalyst of claim 1, wherein a weight ratio of the metal catalyst and the nitrogen-containing compound ranges from 1:2 to 25:1.

5. A membrane electrode assembly for a fuel cell, comprising:
a proton exchangeable polymer membrane;
a cathode catalyst layer and an anode catalyst layer respectively disposed on both sides of the polymer membrane; and
two gas diffusion layers respectively disposed on the cathode and anode catalyst layers, wherein at least one of the cathode and anode catalyst layers includes a metal catalyst modified by a nitrogen-containing compound, and the nitrogen-containing compound is a nitrogen-containing 5-membered heterocyclic compound, wherein the nitrogen-containing compound is selected from the following group consisting of pyrrole and pyrrole derivatives (pyrroles), pyrroline and pyrroline derivatives (pyrrolines), imidazole and imidazole derivatives (imidazoles), imidazoline and imidazoline derivatives (imidazolines), and triazole and triazole derivatives (triazoles), wherein the nitrogen-containing compound has the structure of the following formula (I):

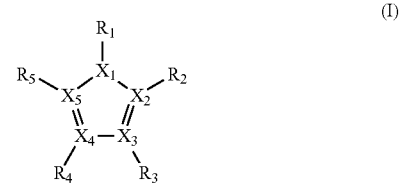

wherein $R_1$-$R_5$ are individually hydrogen, alkyl, $NH_2$ or $NR_6R_7$, $R_6$ and $R_7$ are individually alkyl, hydroxyl or alkoxyl, $X_1$ is nitrogen, and $X_2$, $X_3$, $X_4$ and $X_5$ are individually carbon or nitrogen, and the nitrogen-containing compound is electro-neutral; or the nitrogen-containing compound has the structure of the following formula (II)

(II)

wherein $S_1$-$S_7$ are individually hydrogen, alkyl, $NH_2$ or $NS_8S_9$, $S_8$ and $S_9$ are individually alkyl, hydroxyl or alkoxyl, $Y_1$ is nitrogen and $Y_2$, $Y_3$ $Y_4$ and $Y_5$ are individually carbon or nitrogen, and the nitrogen-containing compound is electro-neutral.

6. The assembly of claim 5, wherein the nitrogen-containing compound is selected from the following group consisting of N-methylpyrrole, 1,2,3-triazole, 1,2,4-triazole, 2-methyl-2-imidazoline and 2,4-dimethyl-2-imidazoline.

7. The assembly of claim 5, wherein the metal catalyst is a pure metal catalyst or a metal catalyst with a support.

8. The assembly of claim 5, wherein a weight ratio of the metal catalyst and the nitrogen-containing compound ranges from 1:2 to 25:1.

* * * * *